(12) United States Patent
Kim

(10) Patent No.: US 12,646,525 B2
(45) Date of Patent: Jun. 2, 2026

(54) VOICE PROCESSING APPARATUS FOR PROCESSING VOICES, VOICE PROCESSING SYSTEM, AND VOICE PROCESSING METHOD

(71) Applicant: AMOSENSE CO., LTD., Cheonan-si (KR)

(72) Inventor: Jungmin Kim, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 275 days.

(21) Appl. No.: 18/564,596

(22) PCT Filed: May 20, 2022

(86) PCT No.: PCT/KR2022/007250
§ 371 (c)(1),
(2) Date: Nov. 27, 2023

(87) PCT Pub. No.: WO2022/250387
PCT Pub. Date: Dec. 1, 2022

(65) Prior Publication Data
US 2024/0257824 A1 Aug. 1, 2024

(30) Foreign Application Priority Data
May 27, 2021 (KR) ........................ 10-2021-0067977

(51) Int. Cl.
*G10L 21/028* (2013.01)
*G10L 17/02* (2013.01)
*G10L 17/06* (2013.01)
(52) U.S. Cl.
CPC ............ *G10L 21/028* (2013.01); *G10L 17/02* (2013.01); *G10L 17/06* (2013.01)

(58) Field of Classification Search
CPC ....... G10L 21/028; G10L 17/02; G10L 17/06; G10L 21/0272; H04R 1/24; H04R 1/40; H04R 1/245; H04R 1/406; H04R 2460/01
See application file for complete search history.

(56) References Cited

U.S. PATENT DOCUMENTS 9,584,946 B1 * 2/2017 Lyren ..................... H02M 1/08
2018/0288110 A1 10/2018 Kawachi et al.
(Continued)

FOREIGN PATENT DOCUMENTS

JP 2004-109779 A 4/2004
JP 2007322523 A 12/2007
(Continued)

OTHER PUBLICATIONS

JP Office Action dated Oct. 7, 2024 in application 2023573293.
(Continued)

*Primary Examiner* — Daniel C Washburn
*Assistant Examiner* — Penny L Caudle
(74) *Attorney, Agent, or Firm* — Maschoff Brennan

(57) ABSTRACT

Disclosed is a voice processing apparatus for processing voices of a plurality of speakers. The voice processing apparatus comprises: a microphone configured to generate voice signals in response to the voices of the plurality of speakers; a communication circuit configured to transmit and receive data; memory; and a processor, wherein the processor, on the basis of instructions stored in the memory, performs sound source separation of the voice signals on the basis of sound source positions of each of the voices, generates separate voice signals associated with each of the voices according to the sound source separation, determines output modes corresponding to the sound source positions of
(Continued)

each of the voices, and uses the communication circuit to output the separate voice signals according to the determined output modes.

8 Claims, 10 Drawing Sheets

(56)                    References Cited

U.S. PATENT DOCUMENTS

| | | | |
|---|---|---|---|
| 2020/0066294 A1* | 2/2020 | Zass | ........................ G10L 17/00 |
| 2020/0275204 A1 | 8/2020 | LaBosco | |

FOREIGN PATENT DOCUMENTS

| | | | |
|---|---|---|---|
| JP | 2010-221945 A | 10/2010 | |
| JP | 2011-165056 A | 8/2011 | |
| JP | 2014-200064 A | 10/2014 | |
| JP | 2018174442 A | 11/2018 | |
| KR | 10-1508092 B1 | 4/2015 | |
| KR | 10-2020-0036820 A | 4/2020 | |
| WO | WO-2019003131 A1 * | 1/2019 | ............. G10L 25/51 |

OTHER PUBLICATIONS

KR Office Action dated Jul. 14, 2023 as received in Application No. 10-2021-0067977.
KR Decision to Grant Dated Aug. 30, 2023 as received in Application No. 10-2021-0067977.

* cited by examiner

| SOUND SOURCE POSITION (SPEAKER) | OUTPUT MODE |
|---|---|
| P1 (SPK1) | M1 (VISUALLY) |
| P2 (SPK2) | M2 (AUDIBLY) |
| P3 (SPK3) | M2 (AUDIBLY) |
| P4 (SPK4) | M2 (AUDIBLY) |

| TERMINAL | SOUND SOURCE POSITION (SPEAKER) | OUTPUT MODE |
|---|---|---|
| TERMINAL 1 | P1 (SPK1) | M1 (VISUALLY) |
| | P2 (SPK2) | M2 (AUDIBLY) |
| | P3 (SPK3) | M2 (AUDIBLY) |
| | P4 (SPK4) | M2 (AUDIBLY) |
| TERMINAL 2 | P1 (SPK1) | M3 (NON-OUTPUT) |

●
●
●

VOICE PROCESSING APPARATUS FOR PROCESSING VOICES, VOICE PROCESSING SYSTEM, AND VOICE PROCESSING METHOD

TECHNICAL FIELD

Embodiments of the present disclosure relate to a voice processing apparatus, a voice processing system, and a voice processing method for processing voices.

BACKGROUND ART

A microphone is an apparatus for converting voices into electrical signals. When a microphone is disposed in a space in which a plurality of speakers are positioned, such as conference rooms or classrooms, the microphone receives all voices from the plurality of speakers and generates voice signals related to the voices of the plurality of speakers.

Meanwhile, when the plurality of speakers speak simultaneously, the voices of the plurality of speakers may all be mixed. At this time, it is necessary to separate a voice signal representing a voice of a specific speaker among the voices of the plurality of speakers.

SUMMARY OF INVENTION

Technical Problem

The present disclosure is directed to providing a voice processing apparatus, a voice processing system, and a voice processing method, which may generate a separation voice signal associated with each voice of speakers in response to the voices of the speakers.

The present disclosure is also directed to providing a voice processing apparatus, a voice processing system, and a voice processing method, which may output each voice of speakers according to an output mode set for each speaker using a separation voice signal associated with each voice of the speakers.

Solution to Problem

A voice processing apparatus for processing voices of a plurality of speakers according to embodiments of the present disclosure includes a microphone configured to generate voice signals in response to voices of the plurality of speakers, a communication circuit configured to transmit and receive data, a memory, and a processor, wherein the processor separates sound sources of the voice signals based on a sound source position of each of the voices, generates a separation voice signal associated with each of the voices according to the sound source separation, determines an output mode corresponding to the sound source position of each of the voices; and outputs the separation voice signal according to the determined output mode using the communication circuit, based on commands stored in the memory.

A voice processing method of processing voices of a plurality of speakers according to embodiments of the present disclosure includes generating voice signals in response to voices of the plurality of speakers, separating sound sources of the voice signals based on a sound source position of each of the voices, generating a separate voice signal associated with each of the voices, determining an output mode for the sound source position of each of the voices, and outputting the separation voice signal according to the determined output mode.

Advantageous Effects of Invention

According to the embodiments of the present disclosure, since the separation voice signal associated with the voice from the specific sound source location may be generated based on the sound source location of the voice, it is possible to generate the voice signal with the minimized influence of surrounding noises.

According to the embodiments of the present disclosure, since the voice of each of the plurality of speakers may be separated according to the sound source position and each voice may be output according to the output mode set for each of the speakers, the user can listen to (audibly) or watch (visually) only the voices of some speakers, and thus selectively listen to or watch conversations according to the speaker's importance.

BRIEF DESCRIPTION OF DRAWINGS

FIG. 10 is a view for describing output modes according to the embodiments of the present disclosure.

FIG. 11 is a view for describing output modes according to the embodiments of the present disclosure.

DESCRIPTION OF EMBODIMENTS

Hereinafter, embodiments of the present disclosure will be described with reference to the accompanying drawings.

Figure 1:
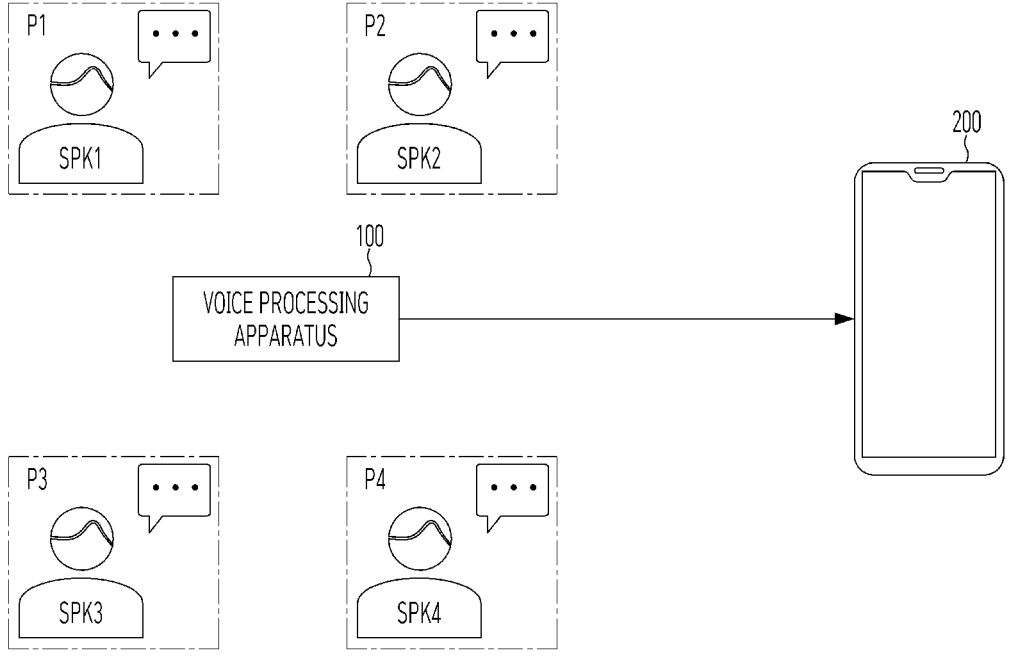
FIG. 1 is a view illustrating a voice processing system according to embodiments of the present disclosure.

FIG. 1 is a view illustrating a voice processing system according to embodiments of the present disclosure. Referring to FIG. 1, a voice processing system 10 may include a voice processing apparatus 100 for generating voice signals corresponding to voices of speaker SPK1 to SPK4 and outputting the generated voice signals, and a user terminal 200 for receiving the voice signals output from the voice processing apparatus 100.

The speakers SPK1 to SPK4 may be positioned in a space (e.g., a conference room, a vehicle, or a classroom) to pronounce their voices. According to embodiments, the first speaker SPK1 may pronounce a voice at a first position P1, the second speaker SPK2 may pronounce a voice at a second position P2, a third speaker SPK3 may pronounce a voice at a third position P3, and the fourth speaker SPK4 may pronounce a voice at a fourth position P4.

The voice processing apparatus 100 is an apparatus capable of processing the voices of the speakers SPK1 to SPK4 and may include a microphone capable of converting voices into electrical signals.

The voice processing apparatus 100 may generate voice signals associated with the voices of the speakers SPK1 to SPK4 in response to the voice of each of the speakers SPK1 to SPK4. The voice signal is a signal associated with voices pronounced for a specific time and may be a signal representing the voices of a plurality of speakers.

According to the embodiments, the voice processing apparatus 100 may determine a sound source position of each of the voices of the speakers SPK1 to SPK4 using the voice signals associated with the voices of the speakers SPK1 to SPK4 and perform sound source separation based on the sound source position, and thus extract (or generate) the separation voice signal associated with the voice of each of the speakers SPK1 to SPK4 from the voice signal.

The voice processing apparatus 100 may store the separation voice signal and sound source position information representing the sound source position.

In other words, the voice processing apparatus 100 may generate the separation voice signals associated with the voices of the speakers SPK1 to SPK4 positioned at the positions P1 to P4 based on the sound source positions of the voices corresponding to the voice signals. For example, the voice processing device 100 may generate a first separation voice signal associated with the voice of the first speaker SPK1 pronounced at the first position P1 based on the voice signal. In this case, the first separation voice signal may be a voice signal with the highest correlation with the voice of the first speaker SPK1 among the voices of the speakers SPK1 to SPK4. In other words, among voice components included in the first separation voice signal, a proportion of a voice component of the first speaker SPK1 may be the highest.

The voice processing apparatus 100 may transmit the separate voice signal associated with each of the voices of the speakers SPK1 to SPK4 to the user terminal 200. According to the embodiments, the voice processing apparatus 100 may transmit the separation voice signal associated with each of the voices of the speakers SPK1 to SPK4 and sound source position information representing the corresponding sound source position to the user terminal 200.

In addition, the voice processing apparatus 100 may provide translation of the voice of each of the speakers SPK1 to SPK4. For example, the voice processing apparatus 100 may determine a source language (translation target language) and a target language (language after translation) for translating the voice of each of the speakers SPK1 to SPK4 and provide the translation for the language of each of the speakers using the separation voice signal.

According to the embodiments, the voice processing apparatus 100 may output the translation result for each of the voices. The translation result may be text data or a voice signal associated with the voice of each of the speakers SPK1 to SPK4 expressed in the target language.

The user terminal 200 may be an electronic device having a communication function and a calculation processing function. For example, the user terminal 200 may be a smartphone, a laptop, a personal digital assistant (PDA), a wearable device, a smart watch, a tablet computer, a television, or the like, but the embodiments of the present disclosure are not limited thereto.

The user terminal 200 may receive the separation voice signal associated with each voice of the speakers SPK1 to SPK4 from the voice processing apparatus 100 and output the received separation voice signal. For example, the user terminal 200 may audibly (i.e., sound) or visually (i.e., subtitle) output the separation voice signal.

Figure 2:
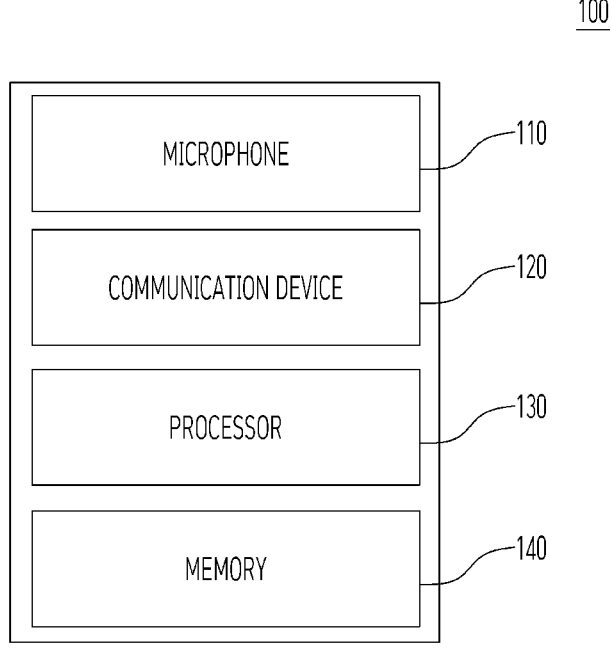
FIG. 2 is a view illustrating a voice processing apparatus according to the embodiments of the present disclosure.

FIG. 2 is a view illustrating a voice processing apparatus according to the embodiments of the present disclosure. Referring to FIG. 2, the voice processing apparatus 100 may include a microphone 110, a communication device 120, a processor 130, a memory 140, and a display 150. According to the embodiments, the voice processing apparatus 100 may further include a speaker 160.

The microphone 110 may generate a voice signal in response to a generated voice. According to the embodiments, the microphone 110 may detect air vibration caused by a voice and generate a voice signal, which is an electrical signal corresponding to the vibration, according to a result of the detection.

According to the embodiments, the microphone 110 may be provided as a plurality of microphones, and each of the plurality of microphones 110 may generate the voice signal in response to the voice. In this case, since a position of each of the plurality of microphones 110 may differ from each other, the voice signals generated from the microphones 110 may have a phase difference (or a time delay).

The communication device 120 may exchange data with an external device according to a wireless communication method. According to the embodiments, the communication device 120 may exchange data with an external device using radio waves of various frequencies. For example, the communication device 120 may exchange data with an external device according to at least one of short-range wireless communication, mid-range wireless communication, and long-distance wireless communication.

The processor 130 may control the overall operation of the voice processing apparatus 100. According to the embodiments, the processor 130 may include a processor with a calculation processing function. For example, the processor 130 may be a central processing unit (CPU), a micro controller unit (MCU), a graphics processing unit (GPU), a digital signal processor (DSP), an analog to digital converter (ADC converter), or a digital to analog converter (DAC converter), but is not limited thereto.

The processor 130 may process the voice signals generated by the microphone 110. For example, the processor 130 may convert an analog type voice signal generated by the microphone 110 into a digital type voice signal and process the converted digital type voice signal. In this case, since the type (analog or digital) of signal changes, the digital type voice signal and the analog type voice signal will be used interchangeably in the description of embodiments of the present invention.

According to the embodiments, the processor 130 may extract (or generate) the separation voice signal associated with the voice of each of the speakers SPK1 to SPK4 using the voice signal generated by the microphone 110. According to the embodiments, the processor 130 may generate the separation voice signals associated with the voices of the speakers SPK1 to SPK4 positioned at the positions P1 to P4, respectively.

The processor 130 may determine sound source positions of the voices (i.e., the positions of the speakers SPK1 to SPK4) using a time delay (or a phase delay) between the voice signals. For example, the processor 130 may determine relative positions of the sound sources (i.e., the speakers SPK1 to SPK4) with respect to the voice processing apparatus 100.

The processor 130 may generate the separate voice signal associated with the voices of each of the speakers SPK1 to SPK4 based on the determined sound source position. For example, the processor 130 may generate a first separation voice signal associated with the voice of the first speaker SPK1 based on the sound source positions of the voices.

According to the embodiments, the processor 130 may match sound source position information representing the determined sound source position with the separation voice signal and store a result of matching. For example, the processor 130 may match the first separation voice signal associated with the voice of the first speaker SPK1 with first sound source position information representing the sound source position of the voice of the first speaker SPK1 and store a result of matching in the memory 140.

An operation of the processor 130 or the voice processing apparatus 100 described in the specification may be implemented in the form of a program executable by a computing device. For example, the processor 130 may execute an application stored in the memory 140 and perform operations corresponding to commands instructing specific operations depending on the execution of the application.

The memory 140 may store data necessary for the operation of the voice processing apparatus 100. For example, the memory 140 may include at least one of a non-volatile memory and a volatile memory.

According to the embodiments, the memory 140 may store an identifier corresponding to each of the positions P1 to P4 in space. The identifier may be data for distinguishing the positions P1 to P4. Since each of the speakers SPK1 to SPK4 is positioned in each of the positions P1 to P4, each of the speakers SPK1 to SPK4 may be distinguished by using the identifiers corresponding to the positions P1 to P4. For example, a first identifier indicating the first position P1 may represent the first speaker SPK1.

The identifier may be input through an input device (e.g., a touch pad) of the voice processing apparatus 100.

According to the embodiments, the memory 140 may store the sound source position information associated with the position of each of the speakers SPK1 to SPK4 and the separation voice signal associated with the voice of each of the speakers SPK1 to SPK4.

Figure 3:
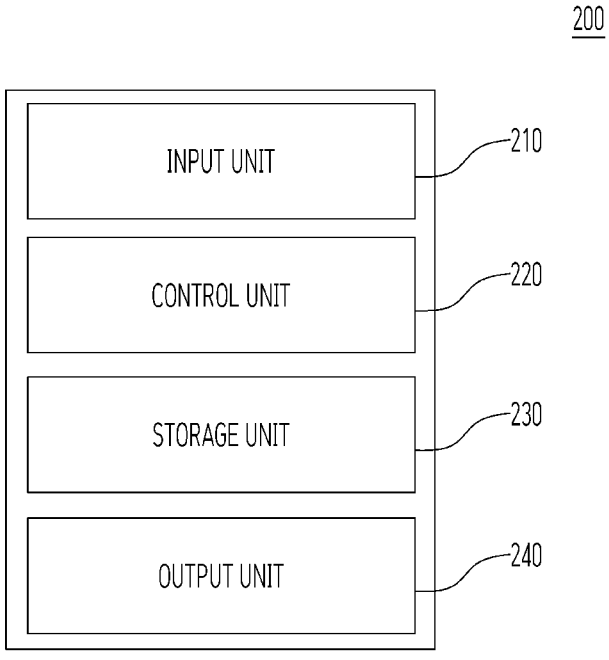
FIG. 3 is a view illustrating a user terminal according to the embodiments of the present disclosure.

FIG. 3 is a view illustrating a user terminal according to the embodiments of the present disclosure. Referring to FIG. 3, the user terminal 200 may include an input unit 210, a control unit 220, a storage unit 230, and an output unit 240.

The input unit 210 may generate an input signal in response to the user's manipulation of the user terminal 200. According to the embodiments, the input unit 210 may generate the input signal, which is an electrical signal, based on the user's manipulation of the user terminal 200. For example, the input unit 210 may be a keyboard, a touch panel, or a touch display, but is not limited thereto.

The control unit 220 may control the overall operation of the user terminal 200. According to the embodiments, the control unit 220 may include a processor with a calculation processing function. For example, the control unit 220 may be a central processing unit (CPU), a micro controller unit (MCU), or an application processor (AP), but is not limited thereto.

The control unit 220 may control the user terminal 200 so that the separation voice signal transmitted from the voice processing apparatus 100 is output. According to the embodiments, the control unit 220 may execute a program (or an application) stored in the storage unit 230 and control the user terminal 200 so that the separation voice signal transmitted from the voice processing apparatus 100 is output through the output unit 240 according to a result of the execution.

According to the embodiments, the control unit 220 may control the user terminal 200 so that the user terminal 200 performs a specific operation according to the execution of the program stored in the storage unit 230. In other words, the operation of the user terminal 200 described in the specification can be understood as an operation caused by the control unit 220 executing the stored program.

The storage unit 230 may store data necessary for the operation of the user terminal 200. According to the embodiments, the storage unit 230 may be a non-volatile memory or a volatile memory, but is not limited thereto.

The output unit 240 may output data stored in the user terminal 200. According to the embodiments, the output unit 240 may output the data stored in the user terminal 200 audibly or visually under the control of the control unit 220. For example, the output unit 240 may be a speaker or display device, but the embodiments of the present disclosure are not limited thereto.

Figure 4:
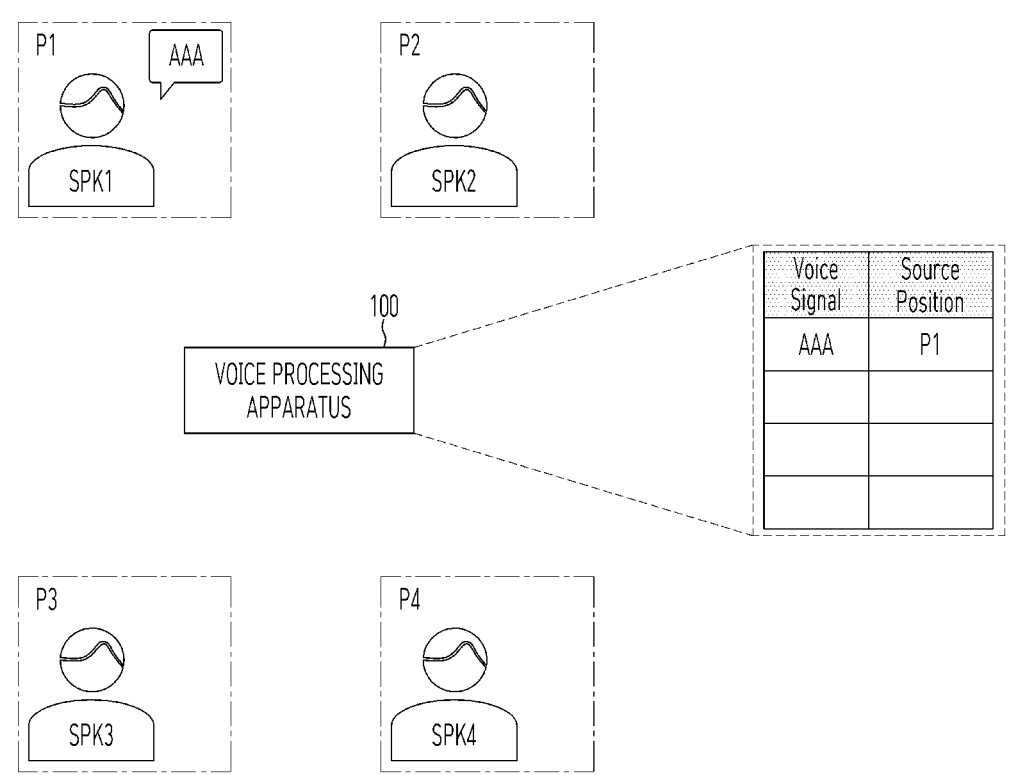
FIGS. 4 to 6 are views for describing an operation of a mobile terminal according to the embodiments of the present disclosure.
Figure 5:
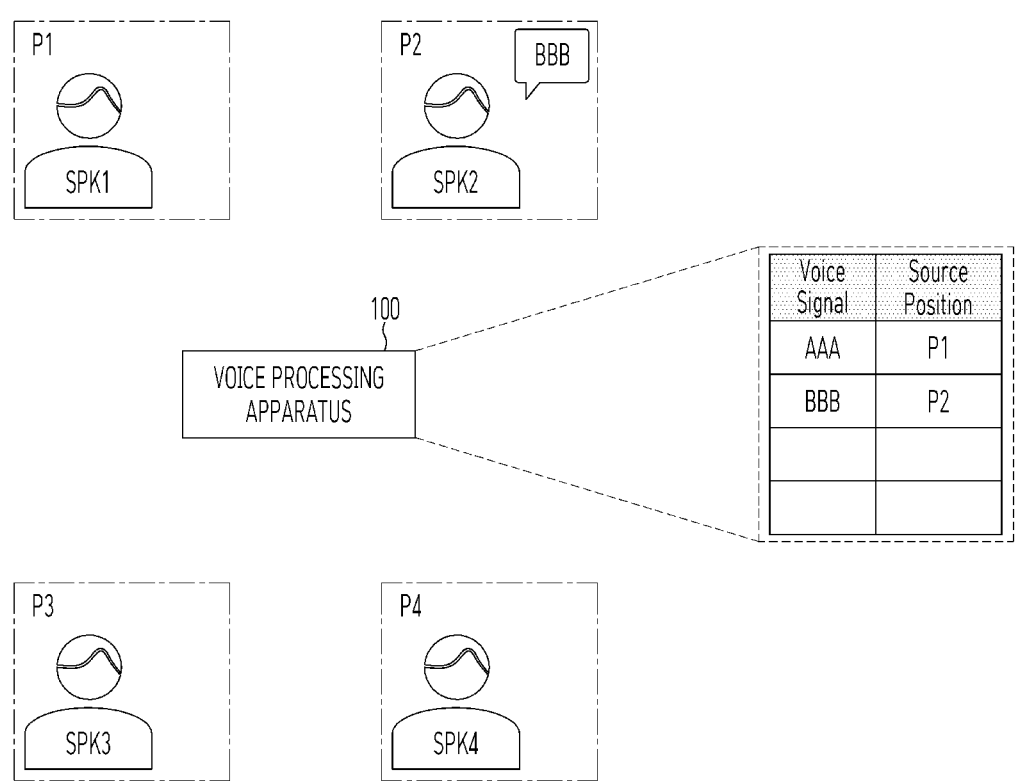
Figure 6:
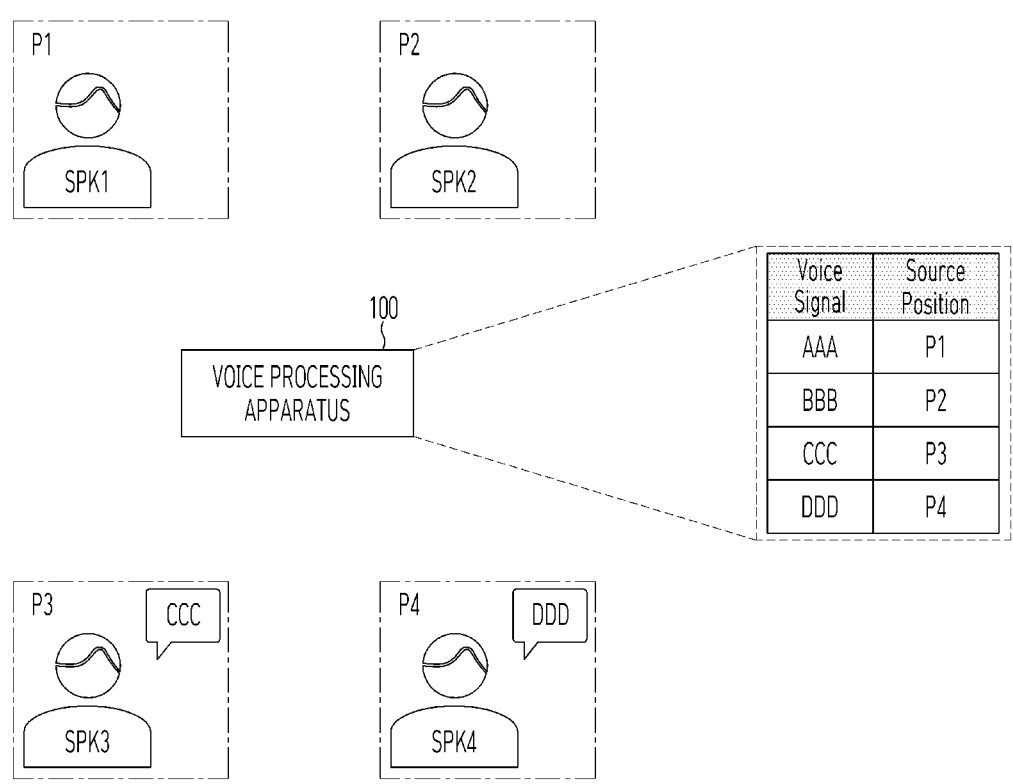

FIGS. 4 to 6 are views for describing an operation of a mobile terminal according to the embodiments of the present disclosure. Referring to FIGS. 4 to 6, each of the speakers SPK1 to SPK4 respectively positioned at the positions P1 to P4 may pronounce.

The voice processing apparatus 100 according to the embodiments of the present disclosure may generate the separation voice signal associated with the voice of each of the speakers SPK1 to SPK4 from the voices of the speakers SPK1 to SPK4 and store the separation voice signals and the position information representing the position of each of the speakers SPK1 to SPK4.

According to the embodiments, the voice processing apparatus 100 may determine the sound source positions of the voices (i.e., the positions of the speakers SPK1 to SPK4) using the time delay (or the phase delay) between the voice signals. For example, the voice processing apparatus 100 may determine relative positions of the sound sources (i.e., the speakers SPK1 to SPK4) with respect to the voice processing apparatus 100.

The voice processing apparatus 100 may generate the separation voice signal associated with the voice of each of the speakers SPK1 to SPK4 based on the determined sound source position.

As illustrated in FIG. 4, the first speaker SPK1 pronounces a voice "AAA." When the voice "AAA" is pronounced, the voice processing apparatus 100 may generate a voice signal associated with the voice "AAA" in response to the voice "AAA." According to the embodiments, the voice signal associated with the voice "AAA" may also include components associated with noises other than the voice "AAA."

According to the embodiments, the voice processing apparatus 100 may generate a separation voice signal associated with the voice "AAA" of the first speaker SPK1 using the generated voice signal. At this time, the voice processing apparatus 100 may store a first separation voice signal associated with the voice "AAA" of the first speaker SPK1 and first sound source position information representing the first position P1, which is the position of the first speaker SPK1, in the memory 140. For example, as illustrated in FIG. 4, the first separation voice signal and the first sound source position information may be stored by being matched.

As illustrated in FIG. 5, the second speaker SPK2 pronounces a voice "BBB." When the voice "BBB" is pronounced, the voice processing apparatus 100 may generate a voice signal associated with the voice "BBB" in response to the voice "BBB."

According to the embodiments, the voice processing apparatus 100 may generate a second separation voice signal associated with the voice "BBB" of the second speaker SPK2 using the generated voice signal. At this time, the voice processing apparatus 100 may store the second separation voice signal associated with the voice "BBB" of the second speaker SPK2 and second sound source position information representing the second position P2, which is the position of the second speaker SPK2, in the memory 140. For example, as illustrated in FIG. 5, the second separation voice signal and the second sound source position information may be stored by being matched.

As illustrated in FIG. 6, the third speaker SPK3 pronounces a voice "CCC" and the fourth speaker SPK4 pronounces a voice "DDD." The voice processing apparatus 100 may generate voice signals associated with the voice "CCC" and the voice "DDD" in response to the voice "CCC" and the voice "DDD." In other words, the voice signal is a voice signal that includes components associated with the voice "CCC" and the voice "DDD."

According to the embodiments, the voice processing apparatus 100 may generate a third separation voice signal associated with the voice "CCC" of the third speaker SPK3 and a fourth separation voice signal associated with the voice "DDD" of the fourth speaker SPK4 using the generated voice signals.

At this time, the voice processing apparatus 100 may store the third separation voice signal associated with the voice "CCC" of the third speaker SPK3 and third sound source position information representing the third position P3, which is the position of the third speaker SPK3, in the memory 140. At this time, the voice processing apparatus 100 may store the fourth separation voice signal associated with the voice "DDD" of the fourth speaker SPK4 and fourth sound source position information representing the fourth position P4, which is the position of the fourth speaker SPK4, in the memory 140. For example, as illustrated in FIG. 6, the third separation voice signal and the third sound source location information may be matched and stored, and the fourth separation voice signal and the fourth sound source location information may be stored by being matched.

In other words, the voice processing apparatus 100 according to the embodiments of the present disclosure may generate the separation voice signal associated with the voice of each of the speakers SPK1 to SPK4 from the voices of the speakers SPK1 to SPK4 and store the separation voice signals and the position information representing the position of each of the speakers SPK1 to SPK4.

Figure 7:
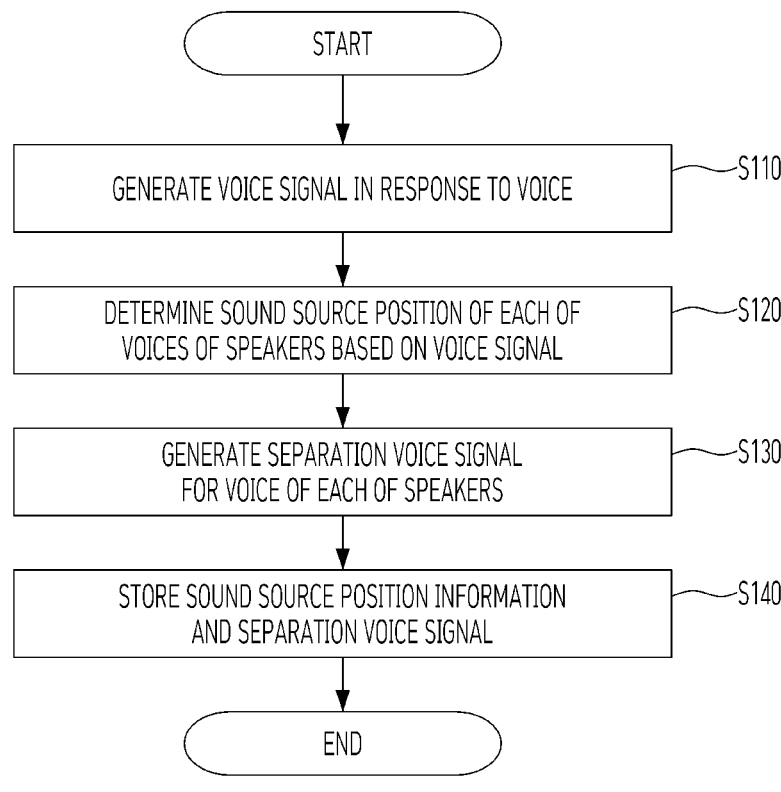
FIG. 7 is a flowchart illustrating a voice separation method according to the embodiments of the present disclosure.

FIG. 7 is a flowchart illustrating a voice separation method performed by the voice processing apparatus according to the embodiments of the present disclosure. A method of operating a mobile terminal to be described with reference to FIG. 7 may be stored in a non-transitory storage medium and implemented by an application (e.g., a voice separation application) executable by a computing device. For example, the processor 130 may execute an application stored in the memory 140 and perform operations corresponding to commands instructing specific operations depending on the execution of the application.

Referring to FIG. 7, the voice processing apparatus 100 may generate the voice signal in response to the voice (S110). According to the embodiments, the voice processing apparatus 100 may convert the voice detected in space into the voice signal, which is an electrical signal.

The voice processing apparatus 100 may determine the sound source position (i.e., the positions of the speakers SPK1 to SPK4) for each of the voices using the voice signal associated with the voices of the speakers SPK1 to SPK4

(S120). According to the embodiments, the voice processing apparatus 100 may generate the sound source position information representing the sound source positions (i.e., the positions of the speakers SPK1 to SPK4) for each of the voices of the speakers SPK1 to SPK4.

The voice processing apparatus 100 may generate the separation voice signal associated with each voice of the speakers SPK1 to SPK4 based on the sound source position for each of the voices (S130). According to the embodiments, the voice processing apparatus 100 may generate the separation voice signal associated with each of the voices of the speakers SPK1 to SPK4 by separating the generated voice signal based on the sound source position for each of the voices. For example, the voice processing apparatus 100 may generate the separation voice signal associated with each of the voices of the speakers SPK1 to SPK4 by separating components included in the voice signal based on the sound source position.

The voice processing apparatus 100 may store the sound source position information representing the sound source position and the separation voice signal (S140). According to the embodiments, the voice processing apparatus 100 may match the sound source position information representing the sound source position and the separation voice signal associated with the voice of each of the speakers SPK1 to SPK4 and store a result of the matching. For example, the voice processing apparatus 100 may match data corresponding to the separation voice signal associated with the voice of each of the speakers SPK1 to SPK4 and the sound source position information and store a result of the matching.

According to the embodiments, the voice processing apparatus 100 (or the processor 130) according to the embodiments of the present disclosure may generate (or separate) the separation voice signal associated with the voice of each of the speakers SPK1 to SPK4 from the voice signal associated with the voices of the speakers SPK1 to SPK4 by executing the application (e.g., the voice separation application) stored in the memory 140.

Figure 8:
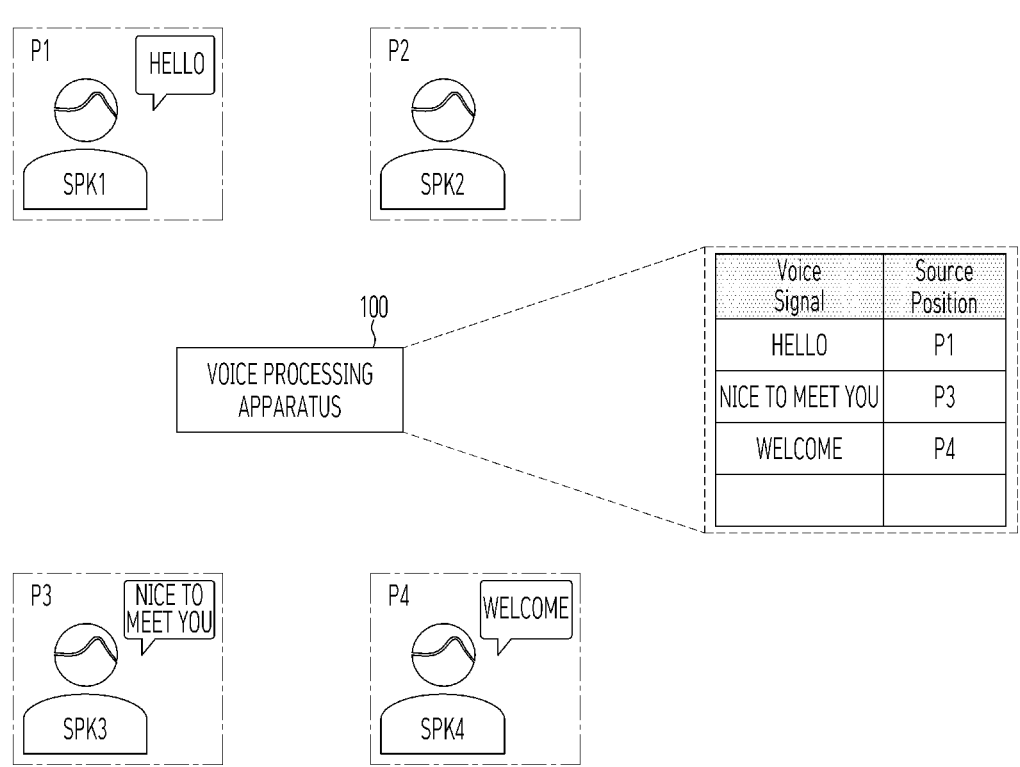
FIGS. 8 and 9 are views for describing a voice processing system according to the embodiments of the present disclosure.
Figure 9:
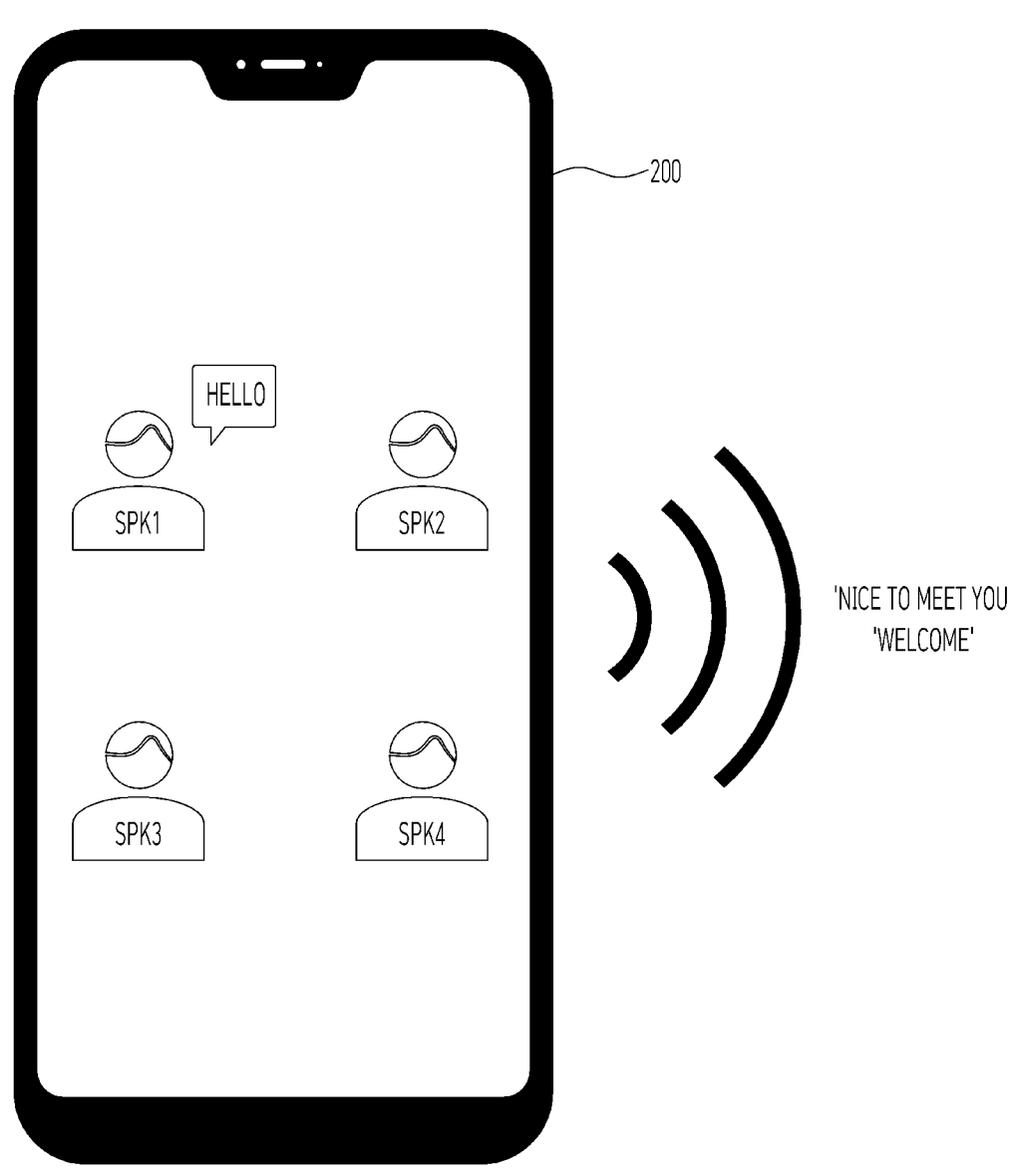

FIGS. 8 and 9 are views for describing a voice processing system according to the embodiments of the present disclosure. Referring to FIGS. 8 and 9, the first speaker SPK1 pronounces "hello," the second speaker SPK2 pronounces "nice to meet you," and the fourth speaker SPK4 pronounces "welcome."

As described with reference to FIGS. 4 to 7, the voice processing apparatus 100 may match separation voice signals associated with the voices ("hello," "nice to meet you," and "welcome") of the speakers SPK1, SPK3, and SPK4 with sound source position information representing the positions of the speakers SPK1, SPK3, and SPK4 and store a result of the matching in the memory 140. In other words, the voice processing apparatus 100 may generate the separation voice signals associated with the voices by separating the voices pronounced by the speakers SPK1, SPK3, and SPK4.

Referring to FIG. 9, the user terminal 200 may receive the separation voice signal related to the voices of each of the speakers SPK1, SPK3, and SPK4 from the voice processing apparatus 100 and visually or audibly output the received separation voice signals.

According to the voice processing system according to the embodiments of the present disclosure, the user terminal 200 may set an output mode for each of the speakers SPK1 to SPK4 (or for each of the sound source positions P1 to P4) and output the voice of each of the speakers SPK1 to SPK4 according to the set output mode. According to the embodiments, the user terminal 200 may output the voice of the first speaker among the speakers SPK1 to SPK4 according to a first mode and output the voice of the second speaker in a second mode differing from the first mode. For example, the user terminal 200 may audibly output the voice of the first speaker according to the first mode and visually output the voice of the second speaker according to the second mode.

As illustrated in FIG. 9, the user terminal 200 may receive the separation voice signals associated with each of the voices ("hello," "nice to meet you," and "welcome") of the speakers SPK1 to SPK4 from the voice processing apparatus 100.

According to the output mode set for each of the speakers SPK1, SPK3, and SPK4, the user terminal 200 may output the voice "hello" of the first speaker SPK1 to the display device (e.g., a display) of the user terminal 200 as subtitles (e.g., visually) and output the voice "nice to meet you" of the third speaker SPK3 and the voice "welcome" of the fourth speaker SPK4 as sounds (e.g., audibly) through the speaker of the user terminal 200. Therefore, the user may check a voice of a specific speaker according to a desired mode.

Meanwhile, if necessary, the user terminal 200 may convert a format of the received voice signal into a format suitable for the output mode. For example, when the voice is output visually, the received voice signal may be converted into text data (speech to text).

FIG. 10 is a view for describing output modes according to the embodiments of the present disclosure. Referring to FIG. 10, the user terminal 200 may store output mode information about the output mode corresponding to each of the speakers SPK1 to SPK4 (or the sound source positions P1 to P4). According to the embodiments, the user terminal 200 may store a table 231 including the output mode information. According to the embodiments, the table 231 may be generated according to the input signal input from the user of the user terminal 200 and stored in the storage unit 230, but the embodiments of the present disclosure are not limited thereto.

The user terminal 200 may determine the output mode for each of the speakers SPK1 to SPK4 with reference to the table 231 stored in the storage unit 230 and output the voice of each of the speakers SPK1 to SPK4 according to the determined output mode using the separation voice signal received from the voice processing apparatus 100.

According to the embodiments, the user terminal 200 may receive the separation voice signal from the voice processing apparatus 100, determine the sound source position corresponding to the separation voice signal, determine the output mode corresponding to each of the separation voice signals from the table 213 using the determined sound source position, and output the voice of each of the speakers SPK1 to SPK4 according to the determined output mode.

For example, as illustrated in FIG. 10, the user terminal 200 may visually output the voice of the first speaker SPK1 at the first position P1 according to a first mode M1 and audibly output the voices of the speakers SPK2, SPK3, and SPK4 at the positions P2, P3, and P4 according to a second mode M2.

Meanwhile, in the specification, the voice output mode was described as any one of visually or audibly outputting the voice, but the embodiments of the present disclosure are not limited thereto, and the output mode according to the embodiments of the present disclosure may include different types of various modes. In addition, not outputting the voice should be understood as one output mode.

FIG. 11 is a view for describing output modes according to the embodiments of the present disclosure. Referring to FIG. 11, the voice processing apparatus 100 may store the output mode information about the output mode corresponding to each of the speakers SPK1 to SPK4 (or the sound source positions P1 to P4). According to the embodiments, the voice processing apparatus 100 may store a table 141 including the output mode information. According to the embodiments, the table 141 may be generated according to the input signal input from the user of the voice processing apparatus 100 and stored in the memory 140, but the embodiments of the present disclosure are not limited thereto.

According to the embodiments, the voice processing apparatus 100 may store the output mode information representing the output mode for each sound source position (or each speaker) for each of a plurality of user terminals. For example, as illustrated in FIG. 11, output mode information about terminal 1 and output mode information about terminal 2 may be stored separately.

The voice processing apparatus 100 may determine the output mode for each of the speakers SPK1 to SPK4 with reference to the table 141 stored in the memory 140 and transmit the separation voice signal to the user terminal 200 according to the determined output mode. According to the embodiments, the voice processing apparatus 100 may transmit the separation voice signal with a format corresponding to the determined output mode to the user terminal 200. Meanwhile, when the output mode is "non-output," the voice processing apparatus 100 may not transmit the corresponding separation voice signal.

According to the embodiments, the voice processing apparatus 100 may convert the stored separation voice signal into the format corresponding to the determined output mode and transmit the separation voice signal with the converted format to the user terminal 200. For example, the voice processing apparatus 100 may convert the separation voice signal for the first speaker SPK1 of terminal 1 into a text data format and transmit the text data, and convert the separation speech signal for the second speaker SPK2 of terminal 1 into a voice signal format and transmit the voice signal, but the embodiments of the present disclosure are not limited thereto.

The voice processing apparatus 100 according to the embodiments of the present disclosure may generate the voice signals associated with the voices of the speakers SPK1 to SPK4 and generate the separation voice signal associated with the voice of each of the speakers SPK1 to SPK4 by processing the voice signals.

According to the embodiments of the present disclosure, the user terminal 200 may output the separation voice signal associated with the voice of each of the speakers SPK1 to SPK4 transmitted from the voice processing apparatus 100 according to the output mode set for each of the speakers SPK1 to SPK4. Therefore, since the user may listen to (audibly) or watch (visually) only the voices of some speakers, it is possible to selectively listen to or watch conversations depending on the importance of the speakers.

As described above, although the embodiments were described with reference to limited examples and drawings, various modifications and changes can be made by those skilled in the art from the above description. For example, although the described techniques may be performed in a different order from the described method and/or components of the described system, structure, apparatus, circuit, and the like may be coupled or combined in a different form from the described method or replaced with or substituted with other components or equivalents, appropriate results can be achieved.

Therefore, other implementations, other embodiments, and equivalents of the claims also fall within the scope of the claims to be described below.

INDUSTRIAL APPLICABILITY

Embodiments of the present disclosure relate to a voice processing apparatus, a voice processing system, and a voice processing method for processing voices.

The invention claimed is:

1. A voice processing apparatus for processing voices of a plurality of speakers, comprising:
   a microphone configured to generate voice signals in response to voices of the plurality of speakers;
   a communication circuit configured to transmit and receive data;
   a memory; and
   a processor,
   wherein the processor is configured to:
      separate sound sources of the voice signals based on a sound source position of each of the voices,
      generate a separation voice signal associated with each of the voices according to the sound source separation,
      determine an output mode corresponding to the sound source position of each of the voices, and
      output the separation voice signal according to the determined output mode using the communication circuit, based on commands stored in the memory,
      wherein the memory stores output mode information representing an output mode corresponding to the sound source position of each of the voices,
      wherein the processor determines the output mode corresponding to each sound source position with reference to the stored output mode information, and
      wherein the processor is further configured to:
         generate a second separation voice signal by converting a first separation voice signal generated according to a result of the sound source separation into a format corresponding to the output mode,
         output the second separation voice signal using the communication circuit, and
         convert the format of the first separation voice signal into any one of a text data format and a voice data format according to the output mode.

2. The voice processing apparatus of claim 1, wherein the microphone includes a plurality of microphones disposed to form an array.

3. The voice processing apparatus of claim 2, wherein the processor is configured to:
   determine the sound source position of each of the voices based on a time delay between the plurality of voice signals generated from the plurality of microphones; and
   generate the separation voice signal based on the determined sound source position.

4. The voice processing apparatus of claim 3, wherein the processor is configured to:
   generate sound source position information representing the sound source position of each of the voices based on the time delay between the plurality of voice signals generated from the plurality of microphones; and
   match the sound source position information about the voice with the separation voice signal for the voice and store a result of the matching.

5. A voice processing method of processing voices of a plurality of speakers, comprising:
   generating voice signals in response to voices of the plurality of speakers;
   separating sound sources of the voice signals based on a sound source position of each of the voices;
   generating a separation voice signal associated with each of the voices;
   determining an output mode for the sound source position of each of the voices; and
   outputting the separation voice signal according to the determined output mode,
      wherein determining the output mode includes:
         storing output mode information representing an output mode for the sound source position of each of the voices, and
         determining the output mode corresponding to each sound source position with reference to the stored output mode information,
      wherein outputting the separation voice signal according to the output mode includes:
         generating a second separation voice signal by converting a first separation voice signal generated according to a result of separating the sound sources into a format corresponding to the output mode,
            wherein generating the second separation voice signal includes:
               converting a format of the first separation voice signal into any one of a text data format and a voice data format according to the output mode, and
               outputting the second separation voice signal using a communication circuit.

6. The voice processing method of claim 5, wherein generating the voice signals includes using a plurality of microphones disposed to form an array.

7. The voice processing method of claim 6, wherein separating the sound sources includes:
   determining the sound source position of each of the voices based on a time delay between the voice signals generated from the plurality of microphones, and
   generating the separation voice signal based on the sound source position.

8. The voice processing method of claim 7, wherein separating the sound sources includes:
   generating sound source position information representing the sound source position of each of the voices based on the time delay between the voice signals generated from the plurality of microphones,
   matching the sound source position information about the voice with the separation voice signal for the voice, and
   storing a result of the matching.

* * * * *